United States Patent
Yoshida et al.

(10) Patent No.: US 12,512,126 B2
(45) Date of Patent: Dec. 30, 2025

(54) REAL-TIME EDITING SYSTEM

(71) Applicant: SAKURA EIKI CO., LTD., Tokyo (JP)

(72) Inventors: Toshiteru Yoshida, Tokyo (JP); Teruyuki Murata, Tokyo (JP)

(73) Assignee: SAKURA EIKI CO., LTD., Tokyo (JP)

( * ) Notice: Subject to any disclaimer, the term of this patent is extended or adjusted under 35 U.S.C. 154(b) by 0 days.

(21) Appl. No.: 18/862,657

(22) PCT Filed: May 17, 2022

(86) PCT No.: PCT/JP2022/020452
§ 371 (c)(1),
(2) Date: Nov. 4, 2024

(87) PCT Pub. No.: WO2023/223401
PCT Pub. Date: Nov. 23, 2023

(65) Prior Publication Data
US 2025/0285646 A1 Sep. 11, 2025

(51) Int. Cl.
*G11B 27/031* (2006.01)
*H04N 19/593* (2014.01)

(52) U.S. Cl.
CPC ......... *G11B 27/031* (2013.01); *H04N 19/593* (2014.11)

(58) Field of Classification Search
CPC .................. G11B 27/031; H04N 19/593
See application file for complete search history.

(56) References Cited

U.S. PATENT DOCUMENTS

| | | | | |
|---|---|---|---|---|
| 9,967,580 | B2* | 5/2018 | Newman | G11B 20/00007 |
| 11,238,290 | B2* | 2/2022 | Burns | H04N 7/185 |
| 2019/0251999 | A1 | 8/2019 | Yoshida et al. | |
| 2020/0396357 | A1 | 12/2020 | Wu et al. | |
| 2022/0232297 | A1* | 7/2022 | Wang | G11B 27/031 |

FOREIGN PATENT DOCUMENTS

| | | |
|---|---|---|
| JP | 2003309805 A | 10/2003 |
| JP | 2020042125 A | 3/2020 |
| WO | 2018008076 A1 | 1/2018 |

OTHER PUBLICATIONS

International Search Report and Written Opinion pertaining to PCT/JP2022/020452, mailed Jul. 12, 2022.

* cited by examiner

*Primary Examiner* — Mishawn N. Hunter
(74) *Attorney, Agent, or Firm* — GRUMBLES LAW PLLC; Brittany Haanan

(57) ABSTRACT

A real-time editing system includes a display device configured to be inputted with an operation command representing editing data processing or video processing, a controller configured to receive the operation command from the display device, perform the editing data processing, and generate a processing command instructing the video processing, and a processor configured to receive the processing command from the controller and perform the video processing.

7 Claims, 8 Drawing Sheets

REAL-TIME EDITING SYSTEM

CROSS-REFERENCE STATEMENT

The present application is a U.S. National Stage, under 35 U.S.C. § 371, of International Patent Application No. PCT/JP2022/020452, filed May 17, 2022, the disclosure of which is hereby incorporated by reference herein in its entirety.

BACKGROUND

Technical Field

The disclosure relates to a real-time editing system.

Related Art

Editing software that operates on a general computer has been proposed for editing high-definition video (resolution of 1920×1080 pixels). Further, real-time editing systems for extremely high-resolution video of 60P (60 frames per second) or 120P (120 frames per second) in 8K (7680×4320 pixels) have been proposed (Patent Literature 1: WO 2018/008076; and Patent Literature 2: Japanese Unexamined Patent Application Publication No. 2020/042125). These real-time editing systems are configured from a plurality of decoding devices, rendering devices, and a control device.

The inventions described in Patent Literatures 1 and 2 are real-time editing systems that provide a complete system for a single video output. In these real-time editing systems, editing data (a timeline) for holding material video in a time series is produced, and editing work is performed by referencing a part of a material video to be cut and pasted on the timeline. In these real-time editing systems, when a reproduction process of the timeline that is a result of editing is performed, a decoding process and a rendering process of the material video are performed in order starting from a head frame, and a result is outputted as a video signal.

In these real-time editing systems, parallel distributed processing is performed due to the load of the decoding process and rendering process becoming large in accordance with the resolution and frame rate of video that is subject to these processes. However, with these real-time editing systems, because video processing is not performed when no playback operation is performed, there is processing capacity that is being unused. To solve this problem of surplus processing capacity, it is considered effective to run, as a background process, arithmetic processing that does not require user interaction when a user is not performing a playback operation.

In addition, with these real-time editing systems, the user needs to operate a terminal (for example, a personal computer or a control device) that is directly connected to an editing system. To solve this problem of having to operate a terminal that is directly connected to the real-time editing system, a virtual desktop infrastructure (VDI), which enables a remote terminal to be operated via a network with a distant terminal, is considered to be effective.

An editing system that performs content production in a remote environment has also been proposed (Patent Literature 3: Japanese Unexamined Patent Application Publication No. 2003/309805). In this editing system, an editing server for performing editing and an editing client for issuing an instruction to the editing server are linked via a network.

Even in cases where the background process and VDI are used with the inventions described in Patent Literatures 1 and 2, the real-time editing system and the user are associated with each other in a one-to-one manner. In order for a plurality of users to perform editing tasks at the same time, there needs to be in operation the same number of editing systems as the users. Thus, there is a problem of an overall processing capacity being considerably in excess. Further, with the VDI, the entire screen that is operated by the user is transmitted and received in real time. This generates a huge amount of network traffic and results in a poor operation response.

The invention described in Patent Literature 3 assumes a relatively coarse-grained editing process that is performed on a content-by-content basis. There is thus a problem that a response required for real-time editing may not be obtained. For example, the conventional technique of this invention is premised on an editing process for assembling a plurality of video works on a single recording medium, and the time required for the process may range from a number of minutes to several tens of minutes, making the technique difficult to be applied to real-time editing.

SUMMARY

A real-time editing system according to the disclosure includes the following: a display device configured to be inputted with an operation command representing predetermined editing data processing or video processing; a controller configured to receive the operation command from the display device, perform the editing data processing, and generate a processing command representing the video processing; and a processor configured to receive the processing command from the controller and perform the video processing.

The display device includes the following: an operation command transmission part configured to generate the operation command in response to an operation of a user and transmit the generated operation command to the controller; an operation response reception part configured to receive an operation response corresponding to the operation command from the controller and display the operation response on a display screen; a first video data reception part configured to receive compressed video data that has undergone the video processing from the controller; a compressed video data decompression part configured to restore video data from the compressed video data received by the first video data reception part; and a video data display part configured to display the video data restored by the compressed video data decompression part on the display screen.

The controller includes the following: an operation command reception part configured to receive the operation command from the display device; an editing data processing part configured to perform editing data processing of the operation command; an operation response transmission part configured to transmit a result of the editing data processing to the display device as the operation response; a processing command transmission part configured to generate the processing command representing video processing of the operation command and transmit the generated processing command to the processor; a second video data reception part configured to receive video data from the processor; a compressed video data generation part configured to compress the video data received by the second video data reception part; and a first video data transmission part configured to transmit the compressed video data generated by the compressed video data generation part to the display device.

The processor includes the following: a processing command reception part configured to receive the processing command from the controller; a video processing part configured to perform video processing of the processing command; and a second video data transmission part configured to transmit video data that has undergone the video processing to the controller.

DETAILED DESCRIPTION

Hereinafter, embodiments of the disclosure will be described with reference to the drawings. However, the embodiments described below are intended to embody a technical idea of the disclosure, and the disclosure is not limited to the following embodiments unless specified otherwise. The same means are denoted by the same reference signs and repeat description may be omitted.

An object of the disclosure is to provide a real-time editing system that is capable of reducing excess arithmetic processing capacity and obtaining a good response.

In the real-time editing system according to an embodiment of the disclosure, user interface (UI) processing is assigned to the display device, editing data processing is assigned to the controller, and video processing is assigned to the processor. Thus, the real-time editing system has a client-server configuration in which the display device is an editing client and the controller and the processor are an editing server. With this configuration, the real-time editing system may be considered to be in a state in which editing clients indirectly share the processor. And therefore, the processing capacity may be made uniform for the system as a whole and excess arithmetic processing capacity may be reduced.

Further, the real-time editing system transmits an operation command and receives an operation response at the time when a user performs an operation. Thus, compared to cases where an entire screen is transmitted and received in real time as in VDI, the real-time editing system may reduce network traffic.

According to the disclosure, it is possible to reduce excess arithmetic processing capacity and obtain a good response.

First Embodiment

Outline of Real-Time Editing System

An outline of a real-time editing system 1 will be described with reference to FIG. 1.

Figure 1:
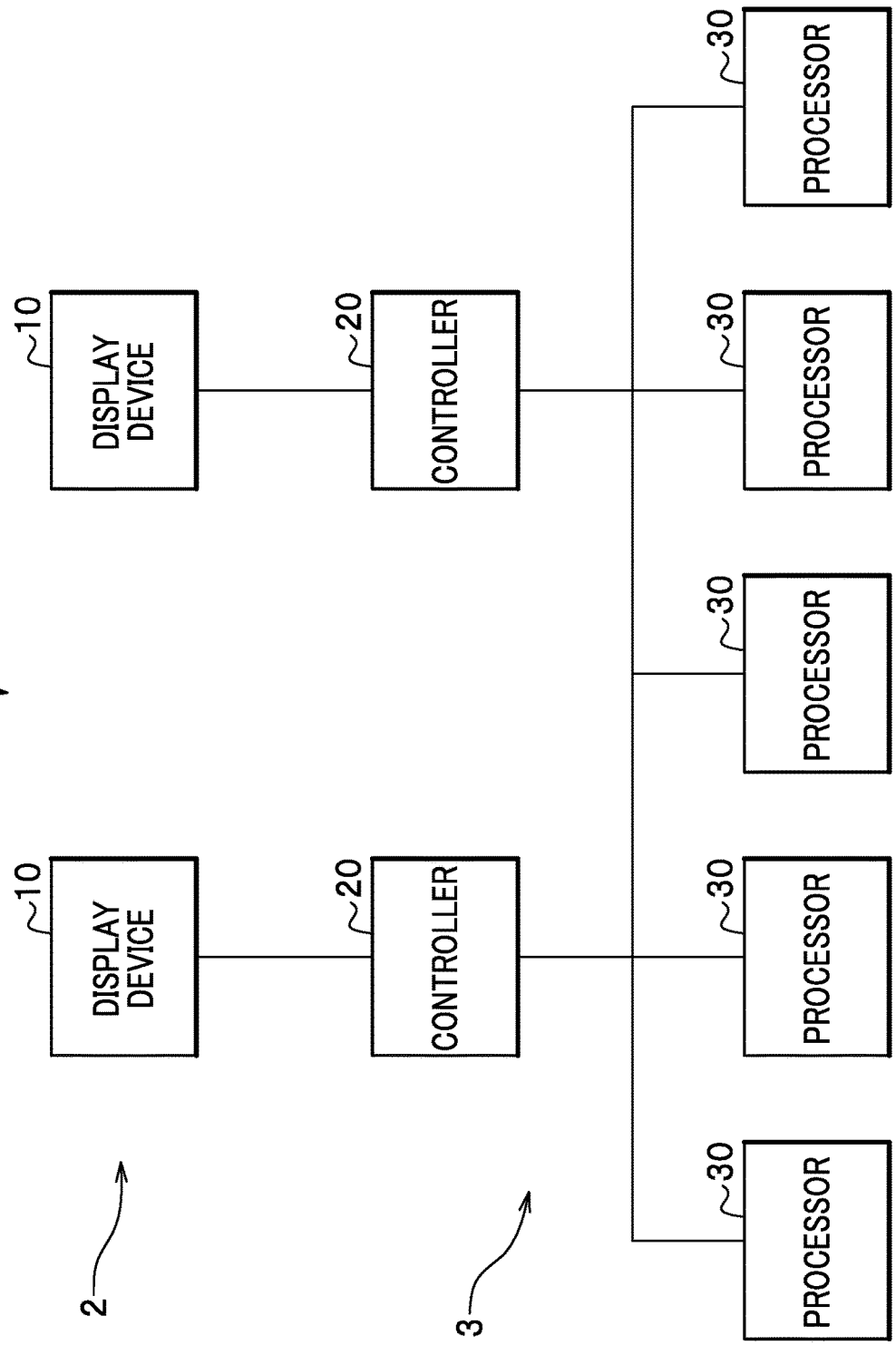
FIG. 1 is a schematic diagram of a real-time editing system according to a first embodiment.

As shown in FIG. 1, the real-time editing system 1 is a client-server type editing system that includes an editing client 2 configured to give an instruction to an editing server 3, which will be described later, and an editing server 3 configured to perform editing processing and video processing in accordance with the instruction. More specifically, the real-time editing system 1 includes, as the editing client 2, a display device 10 and, as the editing server 3, a controller 20 and a processor 30.

The display device 10 is configured to be inputted with an operation command representing predetermined editing data processing or video processing. More specifically, in response to a user operating a general UI, the display device 10 transmits an operation command to the controller 20, receives an operation response, and reflects the operation response on the UI.

The controller 20 is configured to receive an operation command from the display device 10, perform editing data processing, and generate a processing command representing video processing. More specifically, the controller 20 operates editing data in accordance with the operation command received from the display device. Further, when necessary, the controller 20 transmits a processing command to the processor 30 and transmits a processing result of the processor 30 to the display device 10 as an operation response.

The processor 30 is configured to receive a processing command from the controller 20 and perform video processing. More specifically, the processor 30 performs the video processing as instructed by the processing command received from the controller 20 and transmits a processing result to the controller 20.

Here, the user operates the real-time editing system 1 via an input part, such as a mouse, that the display device 10 is equipped with. An operation method of the display device 10 is the same as that of a general windowing system and thus, the details thereof will be omitted. In the real-time editing system 1, communication is established between the devices and these devices are connected by an information sharing part for transmitting and receiving various commands and responses. For example, the information sharing part may be a network, such as Ethernet, or an inter-process shared memory. At this time, in the real-time editing system 1, it is assumed that an intermediate state of an editing result is held in editing data of the controller 20 as an arbitrary data structure.

Processing related to video editing may be broadly divided into UI processing, editing data processing, and video processing. The UI processing is processing related to the UI, such as screen display and mouse operation. The editing data processing is processing related to the editing data, such as addition or deletion of a material video to or from the editing data or playback request of the editing data. The video processing is processing related to a material video, such as decode processing or render processing of the material video.

Among these processes, the UI processing and the editing data processing are executed as required while the user is performing an editing task. The video processing, on the other hand, is performed sporadically in response to a specific operation such as playback of the editing data. That is, frequencies of performing the UI processing and the editing data processing are higher than a frequency of performing the video processing. However, a processing amount per unit time of the video processing is overwhelmingly large compared to a processing amount per unit time of the UI processing and a processing amount per unit time of the editing data processing.

In the real-time editing system 1, in consideration of the characteristics of the above-described processing, the UI processing is assigned to the display device 10, the editing data processing is assigned to the controller 20, and the video processing is assigned to the processor 30. That is, the real-time editing system 1 is a client-server type system in which the display device 10 forms an editing client 2 and the controller 20 and the processor 30 form an editing server 3. With such a system configuration, the real-time editing system 1 may realize a state in which a plurality of editing clients 2 indirectly share many processors 30, may make the processing capacity of the system as a whole uniform, and may reduce excess arithmetic processing capacity.

Most operation commands are completed by the controller 20, except for operations that require video processing. In the case where an operation command is completed by the controller 20, network traffic that is generated between the editing client 2 and the editing server 3 may be kept to a small amount related to transmission and reception of the operation command and to one round trip. Further, in a case where a video that has undergone video processing is transmitted to the display device 10, only a video portion may be transmitted, making it possible to significantly reduce the amount of communication data compared to a case where an entire display screen is transmitted for VDI. Thus, in the real-time editing system 1, a response at a time of remote operation may be greatly improved.

Configuration of Real-Time Editing System

A configuration of a real-time editing system 1 will be described with reference to FIGS. 2 and 3.

Figure 2:
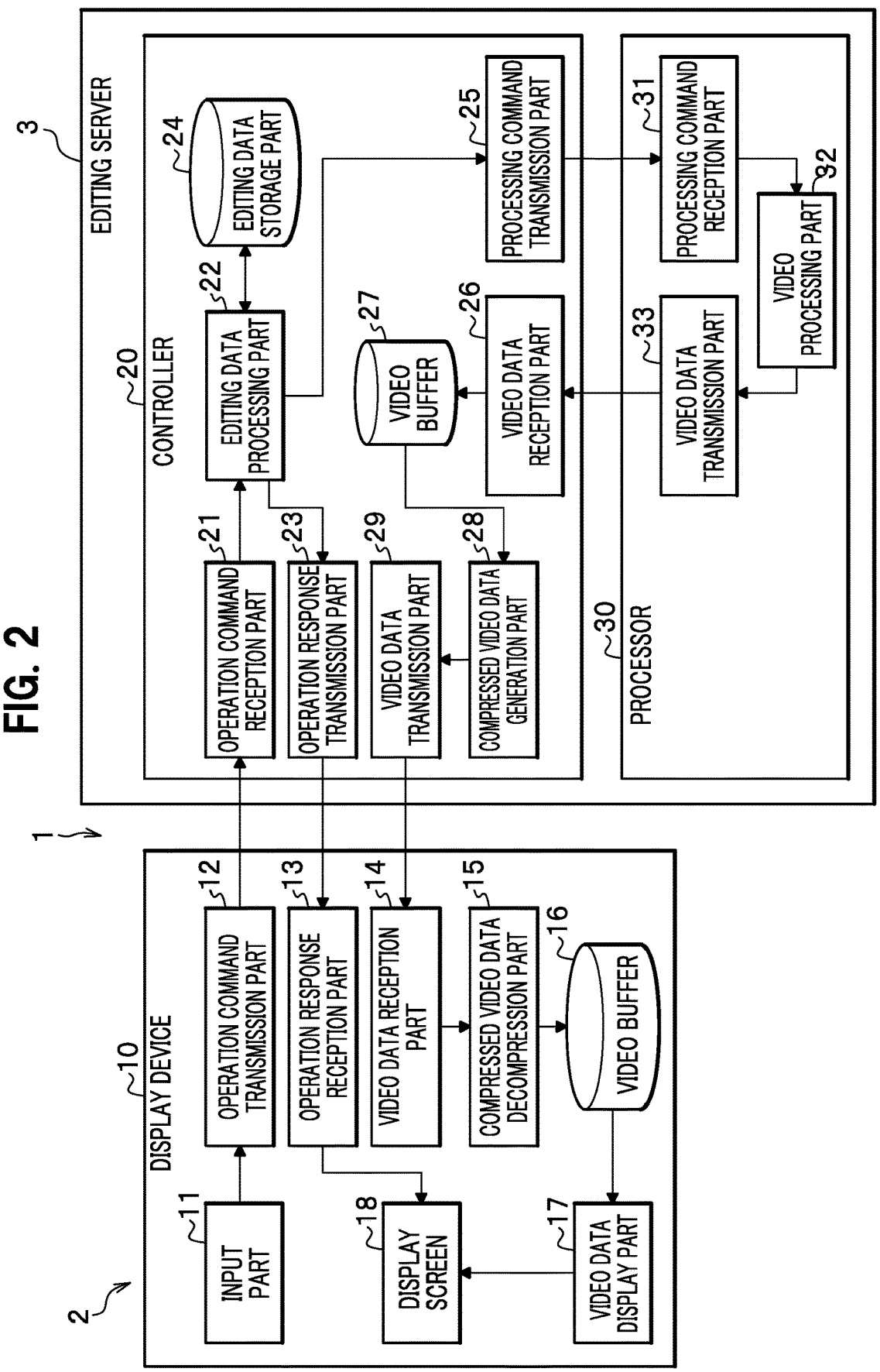
FIG. 2 is a block diagram showing a configuration of a real-time editing system according to the first embodiment.
Figure 3:
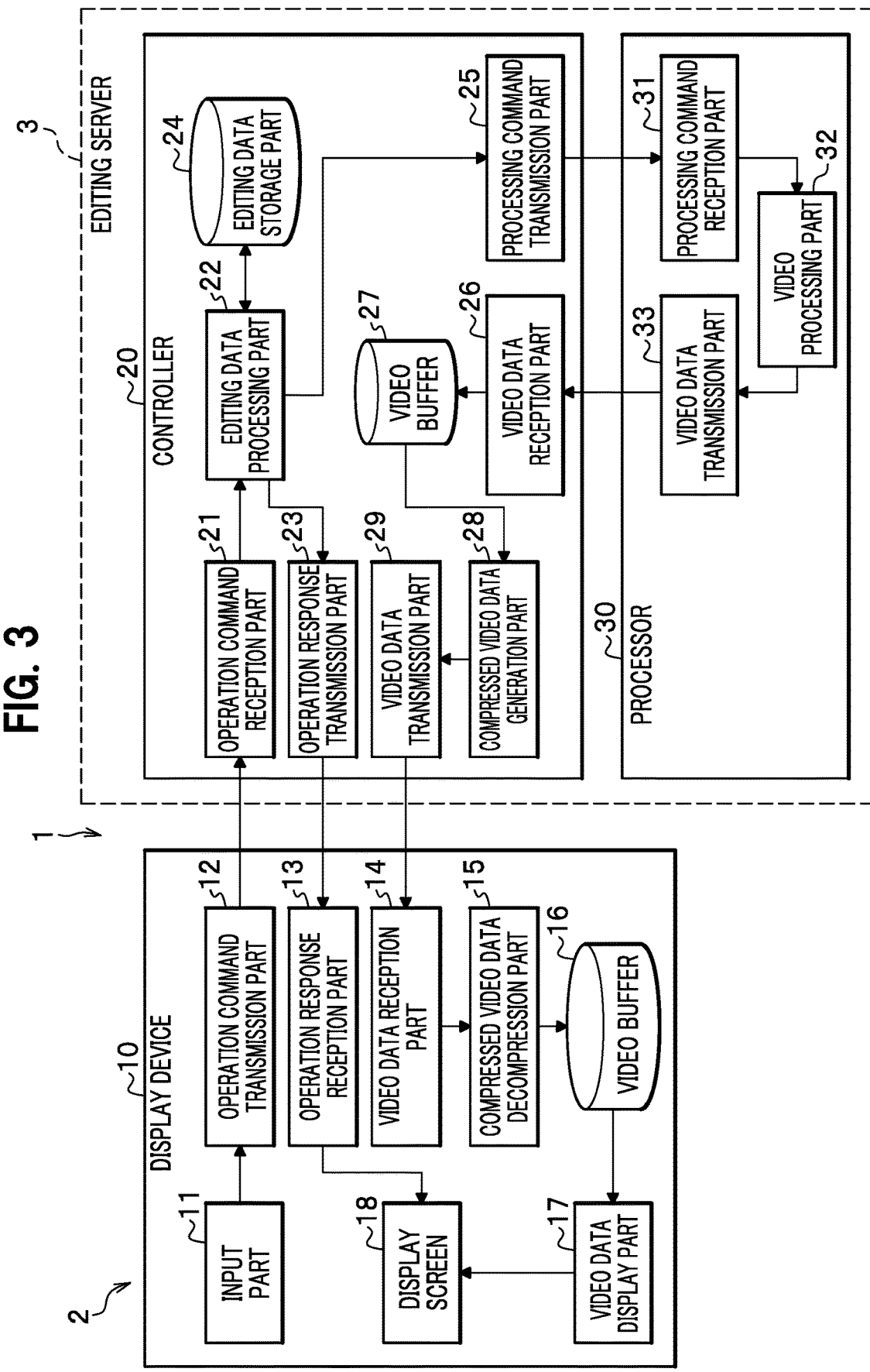
FIG. 3 is a block diagram showing a configuration of a real-time editing system according to the first embodiment.

In FIG. 2, as a minimum configuration example of the real-time editing system 1, one display device 10, one controller 20, and one processor 30 are illustrated, but any number may be chosen for each device.

The controller 20 and the processor 30 may be implemented in any manner. As shown in FIG. 2, the controller 20 and the processor 30 may be implemented on a single piece of hardware. Or, as shown in FIG. 3, the controller 20 and the processor 30 may be implemented on separate pieces of hardware. In the present embodiment, the controller 20 and the processor 30 are implemented in a single editing server 3.

Communication between devices may be roughly divided into transmission and reception of a command and a response and transmission and reception of video data. In the former case, a processing detail is a command, and a processing result is a response, and approximately a few to several hundred bytes of data is transmitted and received between the devices at a time. In this case, inter-process communication using a general remote procedure call (RPC) may be established over a shared memory or a network.

In the latter case, video data of a moving image is transmitted and received in units of frames between devices. At this time, video data for one frame may be as large as several tens of megabytes. As a method of transmitting and receiving such a large amount of data, remote direct memory access (RDMA) using optical communication has been proposed (Patent Literature 1). Because it has become possible to use RDMA with a general network protocol such as Ethernet (a registered trademark) or InfiniBand, an inter-process communication path using a known protocol may be established.

Display Device

As shown in FIG. 2, the display device 10 includes an input part 11, an operation command transmission part 12, an operation response reception part 13, a video data reception part (first video data reception part) 14, a compressed video data decompression part 15, a video buffer 16, a video data display part 17, and a display screen 18.

The input part 11 is configured to be used by a user to input various operations. For example, the input part 11 may be a mouse, a trackball, or a keyboard. The input part 11 outputs a result of an operation by the user to the operation command transmission part 12.

The operation command transmission part 12 is configured to generate an operation command in accordance with an operation by the user and transmit the generated operation command to the controller 20. Here, the operation command transmission part 12 transmits the operation command using an RPC. That is, the operation command transmission part 12 transmits an RPC parameter corresponding to an operation command as a packet to an operation command reception part 21.

For example, a case is considered where the user uses the input part 11 to select a material video and drag-and-drops the material video to a timeline. In this case, the operation command transmission part 12 generates an operation command for editing data processing to "register a material video in editing data" and transmits the operation command to the controller 20. Further, a case is considered where the user presses a play button by using the input part 11. In this case, the operation command transmission part 12 generates an operation command representing editing data processing to "start playback of the editing data" and transmits the operation command to the controller 20. Further, in a case where the user indicates a specific frame of a material video and presses a decode button using the input part 11, the operation command transmission part 12 generates an operation command representing video processing to "decode a specified frame of a material video" and transmits the operation command to the controller 20.

The operation response reception part 13 is configured to receive an operation response (for example, operation complete) corresponding to an operation command from the controller 20 and display the operation response on the display screen 18. Here, the operation response reception part 13 receives the operation response by using the RPC. That is, the operation response reception part 13 receives an RPC parameter corresponding to an operation response as a packet.

The video data reception part 14 is configured to receive compressed video data that has undergone video processing from the controller 20. Here, the video data reception part 14 receives the compressed video data by inter-process communication such as RDMA. The video data reception part 14 outputs the compressed video data that has been received to the compressed video data decompression part 15.

The compressed video data decompression part 15 is configured to decompress the compressed video data that has been received by the video data reception part 14. That is, the compressed video data decompression part 15 decompresses (decodes) the compressed video data inputted from the video data reception part 14. Here, a known video codec, such as H.264, H. 265, or JPEG-XG, may be used for compression and decompression of video data. Thus, for example, video data of several hundred megabits per second may be compressed to approximately several megabits per second, which is 1/100th of the original data or less. The compressed video data decompression part 15 stores the restored video data in the video buffer 16.

The video buffer 16 is a buffer memory for temporarily storing video data that has been inputted from the compressed video data decompression part 15. For example, a general frame memory may be used as the video buffer 16.

The video data display part 17 is configured to display the video data that has been restored by the compressed video data decompression part 15 on the display screen 18. The video data display part 17 reads out the video data from the video buffer 16 at a constant frame rate and displays the video data on the display screen 18.

The display screen 18 is configured to display an operation result of the user (an operation response from the operation response reception part 13) and video data that has undergone video processing (video data from the video data display part 17). That is, a result of video processing (that is, reproduced video) is displayed as a moving image on the display screen 18. Examples of the display screen 18 include a general flat panel display such as a liquid-crystal display.

Controller

As shown in FIG. 2, the controller 20 includes an operation command reception part 21, an editing data processing part 22, an operation response transmission part 23, an editing data storage part 24, a processing command transmission part 25, a video data reception part (second video data reception part) 26, a video buffer 27, a compressed video data generation part 28, and a video data transmission part (first video data transmission part) 29.

The operation command reception part 21 is configured to receive an operation command from the display device 10. Here, the operation command reception part 21 receives the operation command by using an RPC. That is, the operation command reception part 21 receives an RPC parameter corresponding to an operation command as a packet from the operation command transmission part 12. The operation command reception part 21 outputs the received operation command to the editing data processing part 22.

The editing data processing part 22 is configured to perform editing data processing of an operation command. For example, in response to an operation command to "register a material video in editing data", the editing data processing part 22 generates a data structure for referencing the material video and adds the data structure to the editing data in the editing data storage part 24. Then, the editing data processing part 22 generates an operation response representing a result of the editing data processing (processing complete) and outputs the generated operation response to the operation response transmission part 23.

Specifics of the data structure and processing details that are used in editing data processing are general and detailed description thereof will be omitted. When an operation command representing video processing is inputted, the editing data processing part 22 outputs the operation command to the processing command transmission part 25.

The operation response transmission part 23 is configured to transmit a result of editing data processing to the display device 10 as an operation response. The operation response transmission part 23 transmits the operation response by using an RPC. That is, the operation response transmission part 23 transmits an RPC parameter corresponding to an operation response as a packet.

The editing data storage part 24 is a memory for storing editing data (a timeline). Examples of the editing data storage part 24 include a non-transitory storage medium such as a hard disk drive (HDD) and a solid state drive (SSD).

The processing command transmission part 25 is configured to generate a processing command that represents video processing of an operation command and transmit the generated processing command to the processor 30. That is, the processing command transmission part 25 interprets the operation command inputted from the editing data processing part 22 and generates a processing command. The processing command transmission part 25 may transmit the processing command by using an RPC as in the case of an operation command. The processing command is a command representing a detail of video processing and corresponds to a rendering job of Patent Literature 1.

The video data reception part 26 is configured to receive video data from the processor 30. The video data reception part 26 stores the received video data in the video buffer 27.

The video buffer 27 is a buffer memory that temporarily stores the video data inputted from the video data reception part 26. An example of the video buffer 27 includes a general frame memory.

The compressed video data generation part 28 is configured to compress the video data received by the video data reception part 26. The compressed video data generation part 28 reads video data from the video buffer 27 and sequentially compresses the video data. At this time, the compressed video data generation part 28 may use the same video codec as the video codec used by the compressed video data decompression part 15. The compressed video data generation part 28 outputs the generated compressed video data to the video data transmission part 29.

The video data transmission part 29 is configured to transmit the compressed video data generated by the compressed video data generation part 28 to the display device 10. Here, the video data transmission part 29 transmits the compressed video data by inter-process communication such as RDMA.

Processor

As shown in FIG. 2, the processor 30 includes a processing command reception part 31, a video processing part 32, and a video data transmission part (second video data transmission part) 33.

The processing command reception part 31 is configured to receive a processing command from the controller 20. The processing command reception part 31 may receive the processing command by using an RPC like an operation command. Then, the processing command reception part 31 outputs the received processing command to the video processing part 32.

The video processing part 32 is configured to perform video processing for the processing command that has been inputted by the processing command reception part 31. That is, the video processing part 32 performs the video processing that has been specified by the processing command and generates video data (for example, YUV data of 1920×1080 pixels) as a processing result. For example, in response to a processing command to "decode a specified frame in a material video", the video processing part 32 generates video data by decoding the specified frame of the material video. Then, the video processing part 32 outputs the generated video data to the video data transmission part 33. The video processing is a general form of processing and, therefore, further description thereof is omitted.

The video data transmission part 33 is configured to transmit video data that has undergone video processing to the controller 20. That is, the video data transmission part 33 transmits the video data inputted from the video processing part 32 to the controller 20.

As described above, the real-time editing system 1 may realize a real-time video editing function in which a result of an operation by a user is reflected in the editing data and a video that is a result of video processing may be visually recognized on the display screen 18.

Operation of Real-Time Editing System
Editing Data Processing

Figure 4:
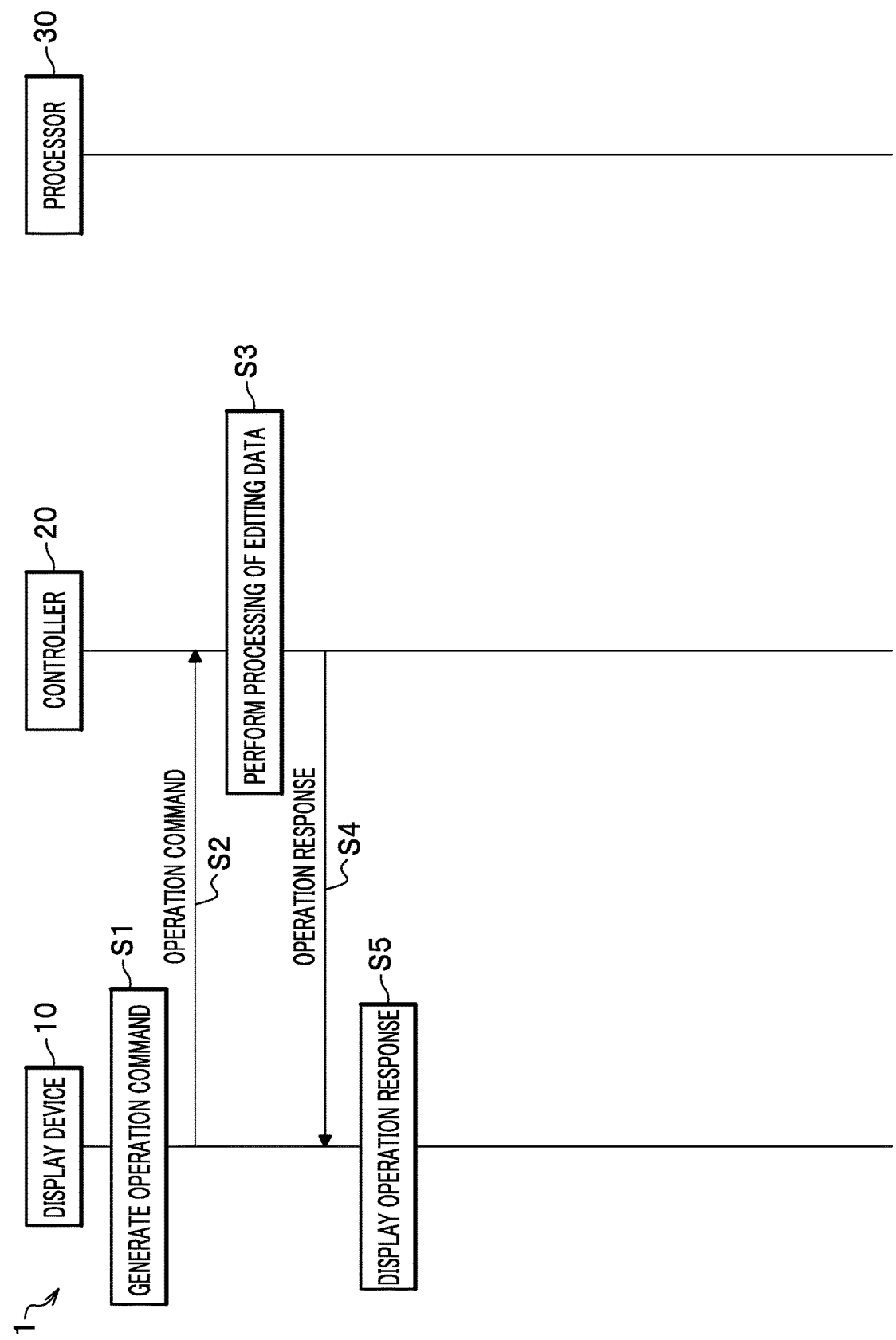
FIG. 4 is a flowchart showing an editing data processing of a real-time editing system according to the first embodiment.

Editing data processing by the real-time editing system 1 will be described with reference to FIG. 4.

Here, it is assumed that a user has performed an operation for the editing data processing. In this case, in step S1, the display device 10 generates an operation command of editing data processing in response to an operation by the user.

In step S2, the display device 10 transmits the operation command generated in step S1 to the controller 20.

In step S3, the controller 20 performs the editing data processing for the operation command received from the display device 10.

In step S4, the controller 20 transmits the result of the editing data processing to the display device 10 as an operation response.

In step S5, the display device 10 displays the operation response that corresponds to the operation command and has been received from the controller 20 on the display screen 18.

As described earlier, most operation commands are for editing data processing and are completed between the display device 10 and the controller 20. Therefore, network traffic that is needed between the editing client 2 and the editing server 3 may be kept to a small amount that is related to transmission and reception of an operation command and may be kept to one round trip.

Video Data Processing

Figure 5:
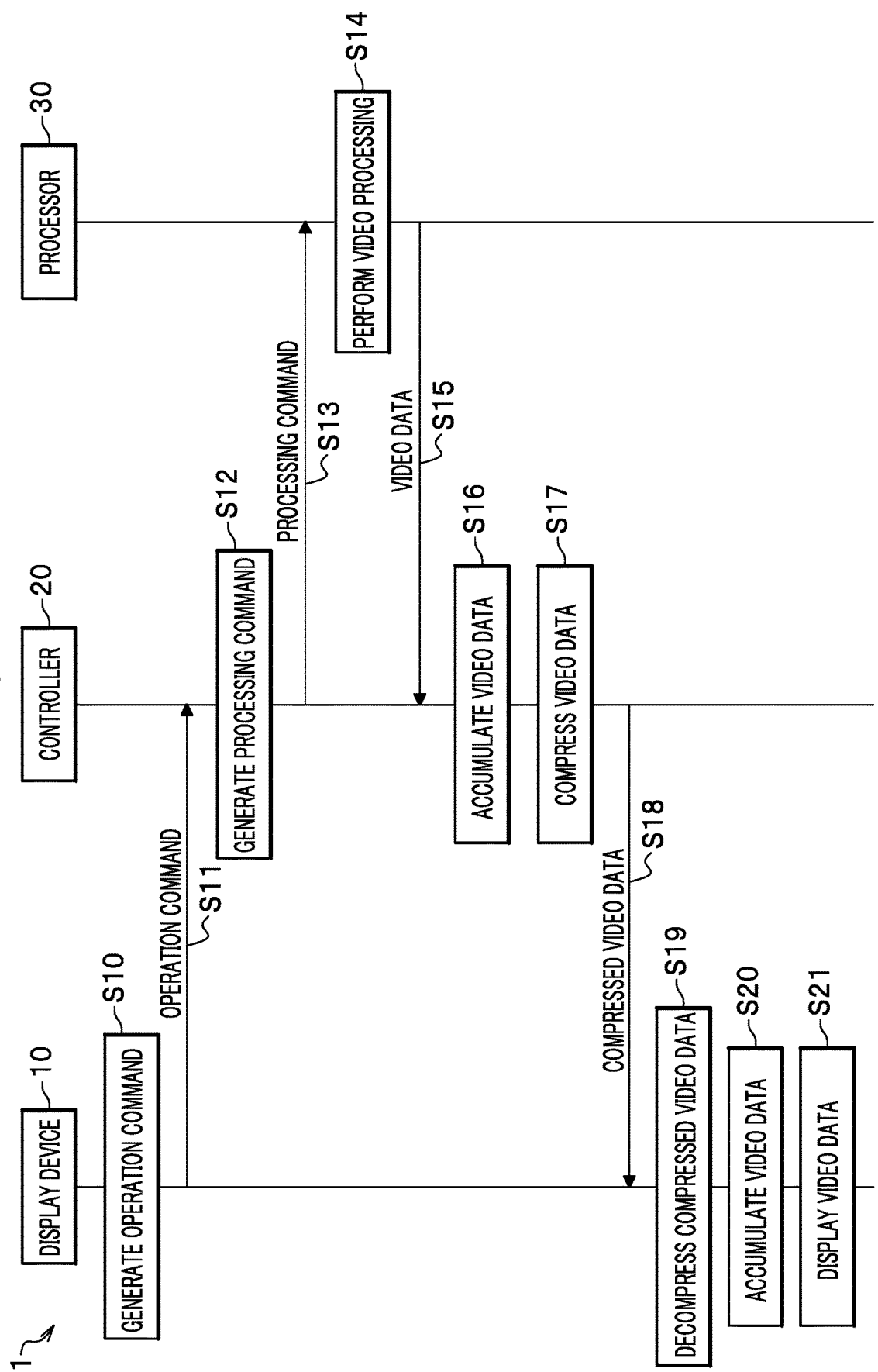
FIG. 5 is a flowchart showing video data processing of a real-time editing system according to the first embodiment.

Video data processing by the real-time editing system 1 will be described with reference to FIG. 5.

Here, it is assumed that a user has performed an operation for the video data processing. In this case, in step S10, the display device 10 generates an operation command of video data processing in accordance with an operation by the user.

In step S11, the display device 10 transmits the operation command generated in step S10 to the controller 20.

In step S12, the controller 20 interprets the operation command received from the display device 10 and generates a processing command.

In step S13, the controller 20 transmits the processing command generated in step S12 to the processor 30.

In step S14, the processor 30 performs video processing for the processing command received from the controller 20.

In step S15, the processor 30 transmits a video data that has undergone the video processing to the controller 20.

In step S16, the controller 20 stores the video data received from the processor 30 in the video buffer 27.

In step S17, the controller 20 reads out the video data from the video buffer 27 and compresses the video data.

In step S18, the controller 20 transmits the compressed video data that has been compressed in step S17 to the display device 10.

In step S19, the display device 10 decompresses the compressed video data received from the controller 20.

In step S20, the display device 10 stores the video data restored in step S19 in the video buffer 16.

In step S21, the display device 10 reads out the video data from the video buffer 16 and displays the video data on the display screen 18.

Operation and Effect

As described above, in the real-time editing system 1, the user interface (UI) processing is assigned to the display device 10, the editing data processing is assigned to the controller 20, and the video processing is assigned to the processor 30. Thus, the real-time editing system 1 has a client-server configuration in which the display device 10 serves as the editing client 2 and the controller 20 and the processor 30 serve as the editing server 3. In this situation, the real-time editing system 1 is considered to be in a state where the editing client 2 indirectly shares the processor 30 and, thus, the processing capability may be made uniform for the system as a whole and excess arithmetic processing capacity may be reduced.

For example, in the real-time editing system 1, the display device 10 may be implemented in a personal computer having low processing capability and the controller 20 and processor 30 may be implemented in a high performance workstation. In this case, the real-time editing system 1 may realize a form of usage in which the material video and the editing data are collectively managed on the workstation and the user connects to the workstation only during an editing task.

Furthermore, because the real-time editing system 1 transmits an operation command at the time of an operation by a user and receives an operation response to the operation command, network traffic may be reduced compared to a case where an entire screen is transmitted and received in real time as with VDI. That is, the real-time editing system 1 does not transmit each mouse operation or the like and receive screen data as with VDI. The real-time editing system 1 may transmit an operation command when a need arises to change the editing data as a result of a mouse operation or the like. Thus, a significant improvement in operation response may be expected.

Furthermore, in the real-time editing system 1, the compressed video data transmitted from the controller 20 to the display device 10 is smaller than original video data. Thus, network traffic may be reduced further, the operation response may be improved further, and the real-time editing system 1 may be used in a lower-speed network. In particular, because the real-time editing system 1 shows a good operation response even when the display device 10 at a remote location and the controller 20 are connected by a wide area network (WAN), it may for example be possible to carry out editing work at home or carry out collaborative editing operation among a plurality of sites.

Further, because the real-time editing system 1 transmits and receives video data compressed by a video codec and transmission and reception of UI components (for example, a button or a list box) of the display screen 18 are not necessary, a user may perform an editing task with an image quality that is substantially the same as that of original video data. In contrast to this, with VDI, UI components on a screen that is displayed on a virtual desktop are also transmitted and received. This generates a large amount of network traffic, often causing degradation in gradation of the screen. This makes it difficult to enable the user to perform an editing task with an image quality that is substantially the same as that of original video data.

Second Embodiment

Configuration of Real-Time Editing System

A configuration of a real-time editing system 1B according to a second embodiment will be described with reference to FIG. 6 on points that are different from the first embodiment.

Figure 6:
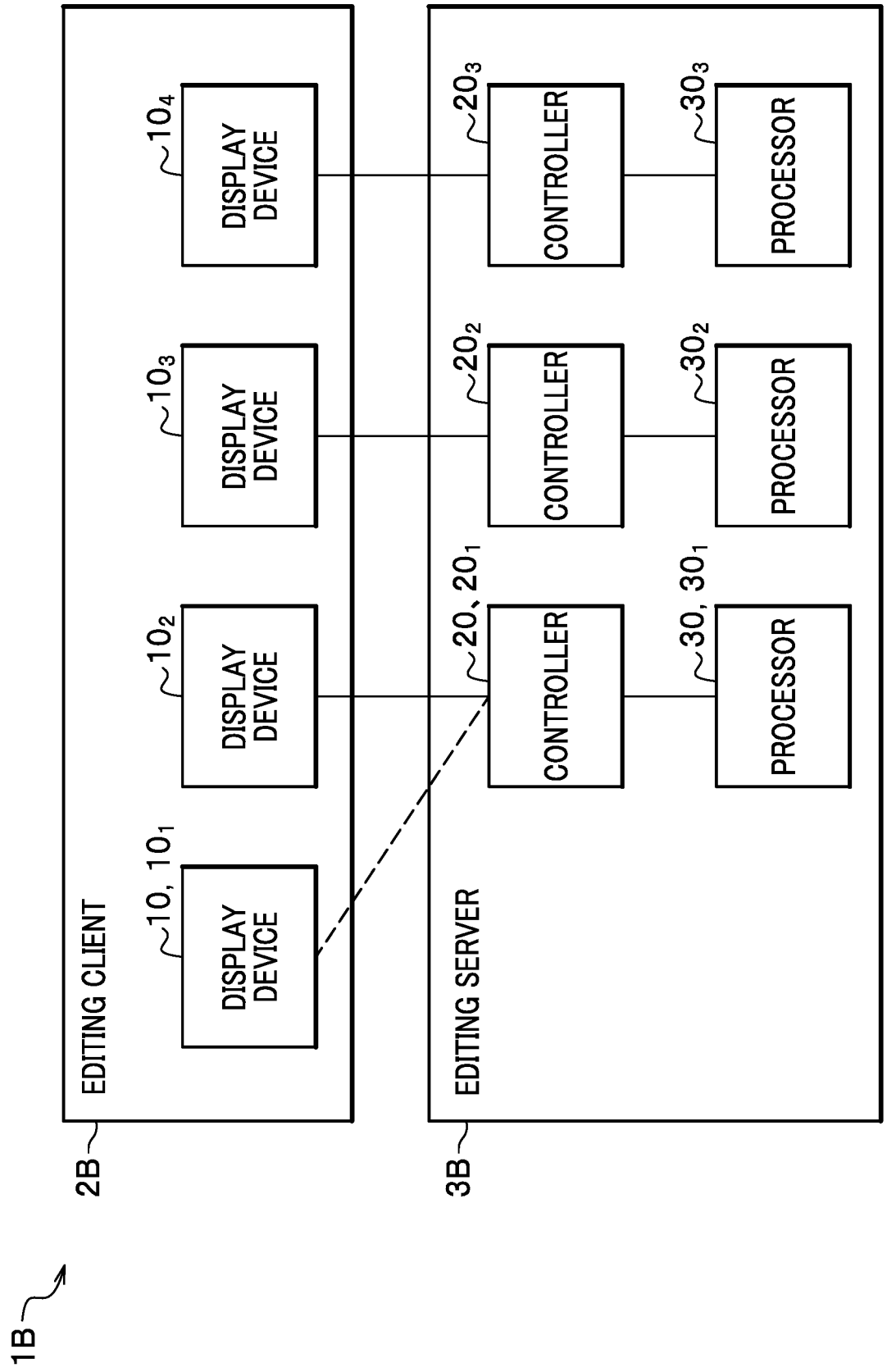
FIG. 6 is a block diagram showing a configuration of a real-time editing system according to a second embodiment.

As shown in FIG. 6, the real-time editing system 1B includes a plurality of display devices 10, a plurality of controllers 20, and a plurality of processors 30.

In the present embodiment, an editing server 3B is configured to include sets of the controllers 20 and the processors 30. The editing server 3B receives an operation command from a display device 10 and performs editing data processing. In the example of FIG. 6, the editing server 3B is configured to include three sets of the controller $20_1$, $20_2$, $20_3$ and the processor $30_1$, $30_2$, $30_3$. In this case, the controller $20_1$ and the processor $30_1$ have a one-to-one correspondence, the controller $20_2$ and the processor $30_2$ have a one-to-one correspondence, and the controller $20_3$ and the processor $30_3$ have a one-to-one correspondence.

The editing client 2B includes a plurality of display devices 10. The number of display devices 10 may be greater than the number of controllers 20. In the example of FIG. 6, the editing client 2B includes four display devices $10_1$ to $10_4$.

A user operates a display device 10 to connect to a controller 20 and performs a video editing task in the same way as the procedure of the first embodiment. Here, there is no fixed correspondence between the display device 10 and the controller 20, and the display device 10 is connected to the controller 20 only while the editing task is being continued. More specifically, the display device 10 logs in to any of the controllers 20. In the example of FIG. 6, a user of the display device $10_1$ logs in to the controller $20_1$ if the controller $20_1$ is not in use.

Processing performed by the display device 10, the controller 20, and the processor 30 are the same as those of the first embodiment and thus, further description thereof will be omitted.

Operation and Effect

As described above, the real-time editing system 1B may reduce excess arithmetic processing capacity and obtain a good response as with the first embodiment.

Further, the real-time editing system 1B may share the whole processing capacity of the editing server 3B among a plurality of users, and, therefore, excess processing capacity may be greatly reduced. In short, compared to a case where independent editing devices are made available so that the number of the editing devices is the same as the number of users, the real-time editing system 1B may realize the same processing capacity at a lower cost.

Third Embodiment

Configuration of Real-Time Editing System

A configuration of a real-time editing system 1C according to a third embodiment will be described with reference to FIG. 7 on points that are different from the second embodiment.

Figure 7:
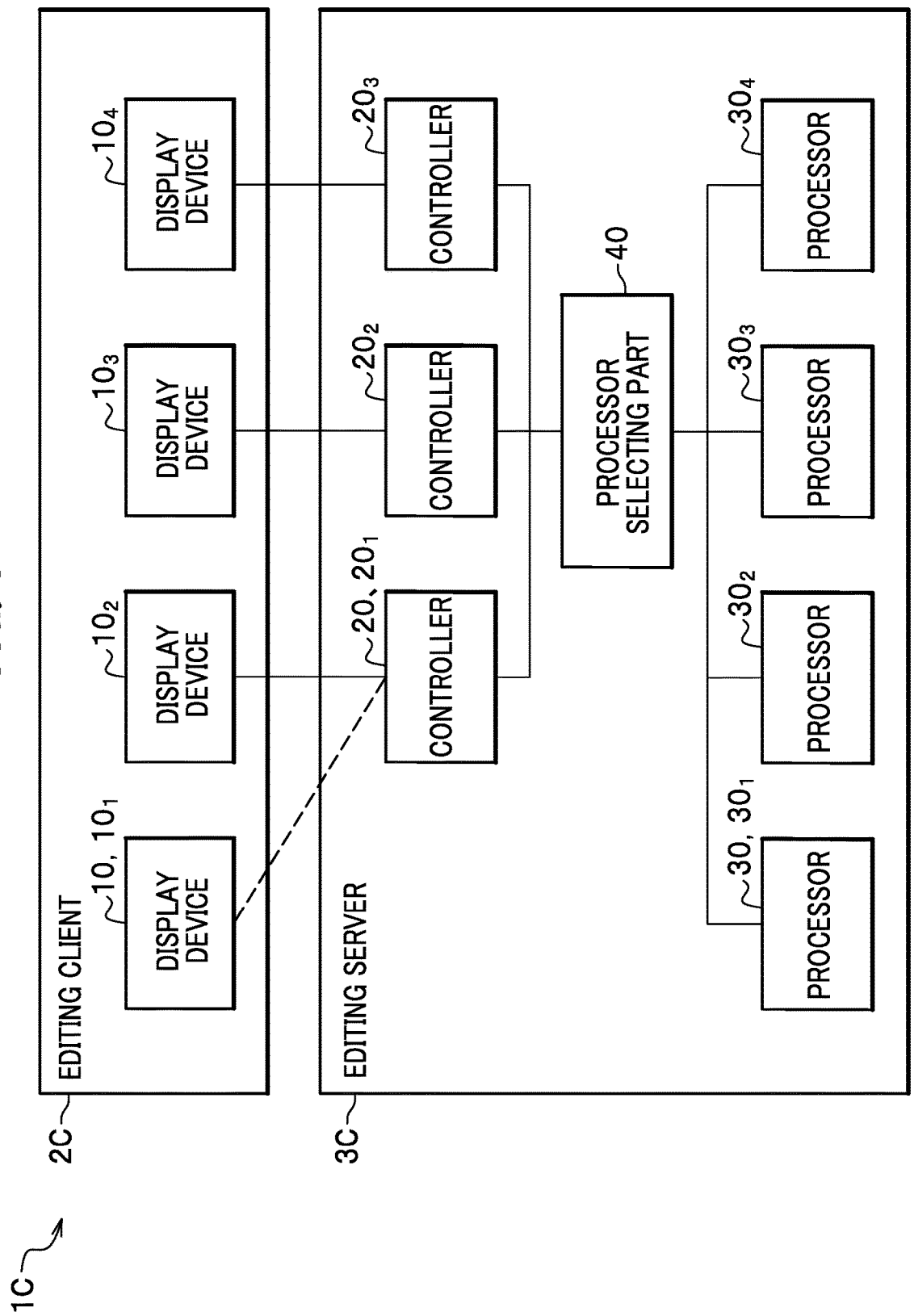
FIG. 7 is a block diagram showing a configuration of a real-time editing system according to a third embodiment.

As shown in FIG. 7, the editing server 3C further includes a processor selecting part 40 that allocates video processing of a processing command transmitted from a controller 20 to any one of the processors 30. Thus, in the real-time editing system 1C, the controller 20 may use any of the processors 30.

The editing server 3C includes the same number or more of processors 30 as the controllers 20. In the example of FIG. 7, the editing server 3C includes three controllers $20_1$ to $20_3$, four processors $30_1$ to $30_4$, and a processor selecting part 40.

The processor selecting part 40 is arranged between the controllers 20 and the processors 30. The processor selecting part 40 distributes video processing to be performed by the processors 30 by allocating a processing command coming from a controller 20 to any of the processors 30. The processor selecting part 40 may perform fine-grained load balancing in units of individual processing commands or may perform coarse-grained load balancing in terms of time that may be between a few seconds to several minutes. For example, the processor selecting part 40 performs load balancing by a general round robin. In this way, in the real-time editing system 1C, the processing commands sporadically transmitted from the plurality of controllers may be performed evenly among the plurality of processors, and computation load of the system as a whole may be evenly distributed.

Operation and Effect

As described above, the real-time editing system 1C may reduce excess arithmetic processing capacity and obtain a good response as with the second embodiment.

Further, the real-time editing system 1C may balance the load of the video processing that changes over time in accordance with editing operation of the user, and thus may reduce excess arithmetic processing for the system as a whole.

Fourth Embodiment

Configuration of Real-Time Editing System

A configuration of a real-time editing system 1D according to a fourth embodiment will be described with reference to FIG. 8 on points that are different from the first embodiment.

Figure 8:
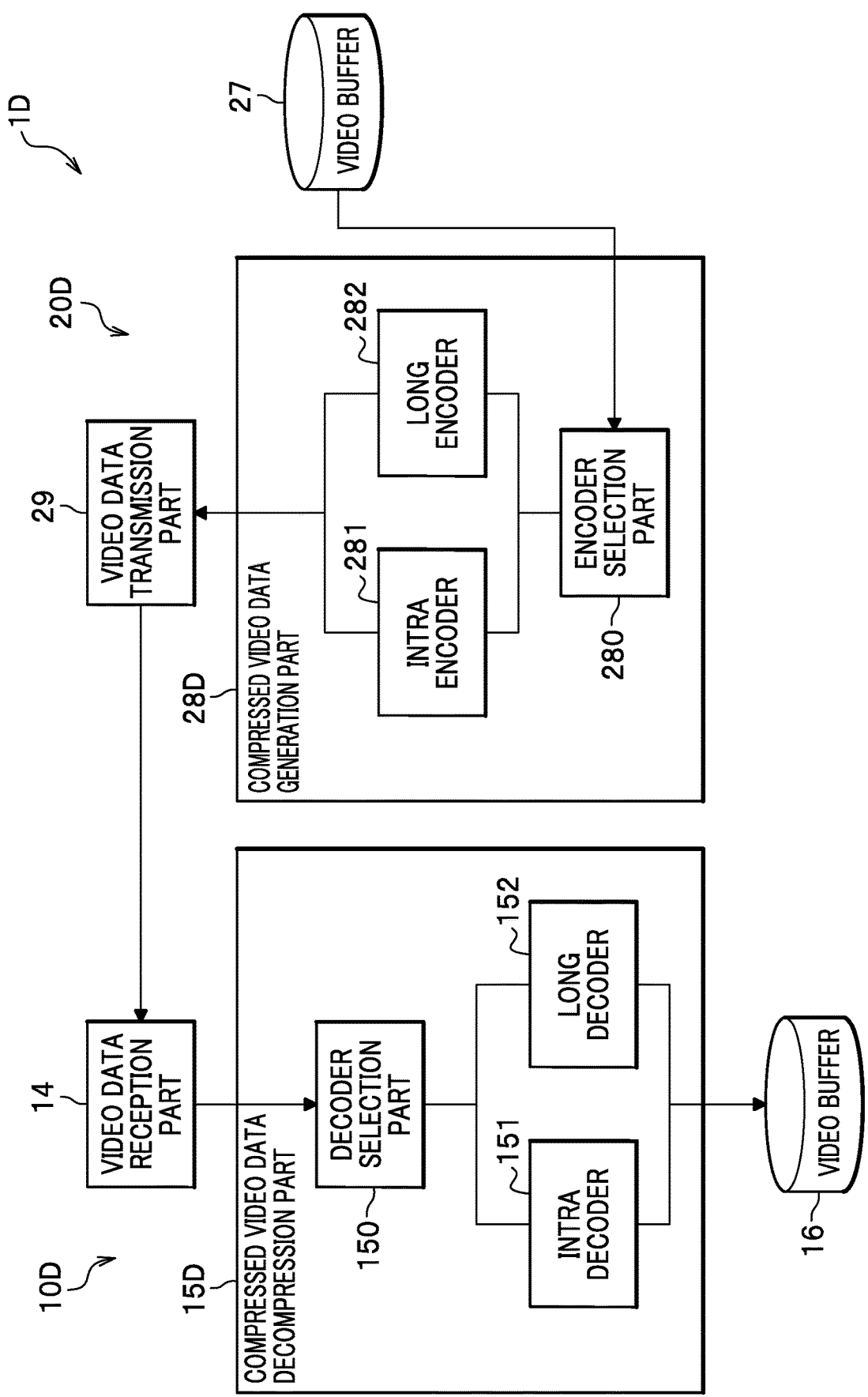
FIG. 8 is a block diagram showing a configuration of a real-time editing system according to a fourth embodiment.

As shown in FIG. 8, a method of compressing and decompressing video data in the display device 10D and the controller 20D is different from that of the first embodiment.

In FIG. 8, to make the drawing easier to understand, illustration of components not directly related to compression and decompression of video data is omitted.

Known video codecs, such as H. 264, H. 265, JPEG-XG, may broadly be classified into an Intra method, which utilizes data correlation among pixels within a frame to perform compression, and Long Group of Pictures (Long GOP), which utilizes data correlation among multiple frames to perform compression.

With the Intra method, because an input and output of the codec correspond to each other in a one-to-one manner, latency (delay time) related to compression and decompression is substantially limited to arithmetic processing time of compression and decompression. In contrast to this, with the Long GOP method, calculation is performed after data of a plurality of frames has accumulated in the codec. The Long GOP method is thus characterized by latency that increases with the amount of accumulation. The Long GOP method is, however, superior to the Intra method in terms of compression efficiency.

In real-time video editing, operations such as play start or play stop and jumping to a specified frame are frequently performed. Thus, when placing an emphasis on operation response, the Intra method is preferable because low latency may be expected. On the other hand, in a case where playback is uninterrupted for a long time, the Long GOP method is preferable from a viewpoint of reducing a data amount.

Therefore, a compressed video data generation part 28D compresses video data using the Intra method for the first few to several frames after a play start operation. Then, after enough video data has been stored in the video data buffer 16 to absorb the latency of the Long GOP method, the compressed video data generation part 28D compresses the video data by the Long GOP method.

As shown in FIG. 8, the compressed video data generation part 28D includes an encoder selection part 280, an Intra encoder 281, and a Long encoder 282.

The encoder selection part 280 is configured to select either the Intra method or the Long GOP method to compress video data. More specifically, the encoder selection part 280 selects the Intra method for a predetermined number of frames starting from a frame from which playback starts. Then, after the predetermined number of frames starting from the frame from which playback starts has been exceeded, the encoder selection part 280 selects the Long GOP method.

The Intra encoder 281 is configured to compress video data by the Intra method based on a selection result of the encoder selection part 280.

The Long encoder 282 is configured to compress video data by the Long GOP method based on the selection result of the encoder selection part 280.

The video data transmission part 29 transmits compressed video data generated by the compressed video data generation part 28D to the video data reception part 14, as in the first embodiment.

The compressed video data decompression part 15D includes a decoder selection part 150, an Intra decoder 151, and a Long decoder 152.

The decoder selection part 150 is configured to select whether compressed video data is to be decompressed by the Intra method or the Long GOP method. Here, the decoder selection part 150 selects the Intra method or the Long GOP method in a similar manner as the encoder selection part 280.

The Intra decoder 151 is configured to decompress the compressed video data with the Intra method based on a selection result of the decoder selection part 150.

The Long decoder 152 is configured to decompress the compressed video data with the Long GOP method based on the selection result of the decoder selection part 150.

Video data restored by the compressed video data decompression part 15D is stored in the video buffer 16 as in the first embodiment.

Operation and Effect

As described above, the real-time editing system 1D may achieve both a good operation response and a reduction in data amount.

Modification

Although embodiments have been described in detail, the disclosure is not limited to the above-described embodiments. The disclosure includes modifications with a design change or the like that is within a scope not departing from the gist of the disclosure.

In the third embodiment, all the controllers are connected to one processor selecting part, but the disclosure is not limited to this configuration. For example, the real-time editing system may include a processor selecting part for each controller, and each processor selecting part may transmit a processing command to any of the processors. Further, the real-time editing system may, for example, include a plurality of editing servers, and a processing command may be transmitted to any processor provided in any of the editing servers. In this way, the real-time editing system may adopt a scalable configuration in accordance with a balance between a scale of the entire system and a processing capability of the editing server.

REFERENCE SIGNS LIST 1, 1B, 1C, 1D Real-time editing system
2, 2B, 2C Editing client
3, 3B, 3C Editing server
10, 101-104, 10D Display device
11 Input part
12 Operation command transmission part
13 Operation response reception part
14 Video data reception part (First video data reception part)
15, 15D Compressed video data decompression part
16 Video buffer
17 Video data display part
18 Display screen
20, $20_1$-$20_3$, 20D Controller
21 Operation command reception part
22 Editing data processing part
23 Operation response transmission part
24 Editing data storage part
25 Processing command transmission part
26 Video data reception part (Second video data reception part)
27 Video buffer
28, 28D Compressed video data generation part
29 Video data transmission part (First video data transmission part)
30, $30_1$-$30_3$ Processor (Video processor)
31 Processing command reception part
32 Video processing part
33 Video data transmission part (Second video data transmission part)
40 Processor selecting part (Video processor selecting part)
150 Decoder selection part
151 Intra decoder
152 Long decoder
280 Encoder selection part
281 Intra encoder
282 Long encoder

The invention claimed is:

1. A real-time editing system comprising:
a display device, including a hardware processor, configured to be inputted with an operation command representing predetermined editing data processing or video processing;
a controller configured to receive the operation command from the display device, perform the editing data processing, and generate a processing command representing the video processing;
and a video processor configured to receive the processing command from the controller and perform the video processing, wherein
the display device includes:
an operation command transmission part configured to generate the operation command in response to an operation of a user and transmit the generated operation command to the controller;
an operation response reception part configured to receive an operation response corresponding to the operation command from the controller and display the operation response on a display screen;

a first video data reception part configured to receive compressed video data that has undergone the video processing from the controller;

a compressed video data decompression part configured to restore video data from the compressed video data received by the first video data reception part; and a video data display part configured to display the video data restored by the compressed video data decompression part on the display screen, wherein the controller includes:

an operation command reception part configured to receive the operation command from the display device;

an editing data processing part configured to perform editing data processing of the operation command;

an operation response transmission part configured to transmit a result of the editing data processing to the display device as the operation response;

a processing command transmission part configured to generate the processing command representing video processing of the operation command and transmit the generated processing command to the video processor;

a second video data reception part configured to receive the video data from the video processor;

a compressed video data generation part configured to compress the video data received by the second video data reception part; and a first video data transmission part configured to transmit the compressed video data generated by the compressed video data generation part to the display device, and wherein the video processor includes:

a processing command reception part configured to receive the processing command from the controller;

a video processing part configured to perform video processing of the processing command; and a second video data transmission part configured to transmit video data that has undergone the video processing to the controller.

2. The real-time editing system according to claim 1, wherein the operation command transmission part and the operation command reception part are configured to transmit and receive the operation command by using a remote procedure call, wherein the operation response transmission part and the operation response reception part are configured to transmit and receive the operation response by using a remote procedure call, and wherein the processing command transmission part and the processing command reception part are configured to transmit and receive the processing command by using a remote procedure call.

3. The real-time editing system according to claim 1, wherein the first video data transmission part and the first video data reception part are configured to transmit and receive the compressed video data by inter-process communication.

4. The real-time editing system according to claim 1, wherein the real-time editing system includes a plurality of the display devices, the real-time editing system includes an editing server comprising sets of the controllers and the video processors, and wherein the editing server is configured to receive the operation command from each display device and perform the editing data processing.

5. The real-time editing system according to claim 4, wherein the editing server further comprises a video processor selecting part configured to allocate video processing of a processing command transmitted by the controller to any one of the video processors.

6. The real-time editing system according to claim 4, wherein the real-time editing system includes a plurality of the editing servers.

7. The real-time editing system according to claim 1, wherein the compressed video data generation part is configured to compress the video data by an Intra method for a preset number of frames starting from a playback starting frame and compress the video data by a Long GOP method after the preset number of frames starting from the playback starting frame have been exceeded, and wherein the compressed video data decompression part is configured to decompress the compressed video data by an Intra method for the preset number of frames starting from the playback starting frame and decompress the compressed video data by a Long GOP method after the preset number of frames starting from the playback starting frame have been exceeded.

* * * * *